US012623674B2

(12) United States Patent (10) Patent No.: US 12,623,674 B2
Markofsky (45) Date of Patent: May 12, 2026

(54) METHOD FOR A CONTINUOUS INTEGRATION APPROACH OF DRIVER ASSISTANCE SYSTEMS

(71) Applicant: Dr. Ing. h.c. F. Porsche Aktiengesellschaft, Stuttgart (DE)

(72) Inventor: Moritz Markofsky, Bruchsal (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 125 days.

(21) Appl. No.: 18/619,317

(22) Filed: Mar. 28, 2024

(65) Prior Publication Data

US 2024/0391476 A1 Nov. 28, 2024

(30) Foreign Application Priority Data

May 23, 2023 (DE) ...................... 10 2023 113 400.0

(51) Int. Cl.
*B60W 50/04* (2006.01)
*B60W 60/00* (2020.01)

(52) U.S. Cl.
CPC ........ *B60W 50/045* (2013.01); *B60W 60/001* (2020.02); *B60W 2050/046* (2013.01); *B60W 2556/00* (2020.02); *B60W 2756/10* (2020.02)

(58) Field of Classification Search
CPC ............. B60W 50/045; B60W 60/001; B60W 2050/046; B60W 2556/00;

(Continued)

(56) References Cited

U.S. PATENT DOCUMENTS 10,255,168 B2   4/2019 Stefan et al.
11,216,355 B2 * 1/2022 Walther .............. G06F 11/3013
(Continued)

FOREIGN PATENT DOCUMENTS

CN       114880224      8/2022
CN       115878493      3/2023
DE   102019134053 A1    6/2021

OTHER PUBLICATIONS

Chen et al., Autonomous Vehicle Testing and Validation Platform: Integrated Simulation System with Hardware in the Loop, Jun. 26-30, 2018, 2018 IEEE Intelligent Vehicles Symposium (IV), pp. 949-956 (Year: 2018).*

(Continued)

*Primary Examiner* — Sze-Hon Kong
(74) *Attorney, Agent, or Firm* — LEYDIG, VOIT & MAYER, LTD.

(57) ABSTRACT

A method uses a continuous integration approach for improving driver assistance systems. The method uses a test data set (11) with a time series of input data and output data of the driver assistance system and is formed during driving in a real traffic. A system-under-test is formed by a continuously changed overall software. A data-driven validation is carried out at predetermined time intervals. The method simultaneously matches (14) the output of a current software version with ground-truth data (13), which results in an assessment of a performance of the current software version and continues by forming a performance statistic on all differences and their performance score and evaluating the changes to the overall software.

20 Claims, 1 Drawing Sheet

(58) Field of Classification Search
CPC ...... B60W 2756/10; B60W 2050/0083; G05B
19/0423; G05B 2219/25257
See application file for complete search history.

(56)                    References Cited

U.S. PATENT DOCUMENTS

| | | | | |
|---|---|---|---|---|
| 11,366,747 | B2 * | 6/2022 | Allen | G06F 11/3476 |
| 11,714,190 | B1 * | 8/2023 | Duncklee | G01S 7/4004 |
| | | | | 342/70 |
| 11,964,670 | B1 * | 4/2024 | Van Alsenoy | G01C 21/3837 |
| 11,983,105 | B2 * | 5/2024 | Vasavan | G06F 11/3692 |
| 12,307,174 | B2 * | 5/2025 | Morrey | G06F 9/44505 |
| 2019/0087585 | A1 | 3/2019 | Ugai | |
| 2021/0103283 | A1 | 4/2021 | Liu et al. | |
| 2022/0197280 | A1 * | 6/2022 | Venkatadri | G07C 5/0808 |
| 2023/0333892 | A1 * | 10/2023 | Kalte | G06F 9/3004 |
| 2023/0376805 | A1 * | 11/2023 | Bhate | G06N 5/04 |
| 2024/0311279 | A1 * | 9/2024 | Düser | G06F 11/3688 |
| 2024/0343293 | A1 * | 10/2024 | Kohári | B62D 5/046 |
| 2025/0265387 | A1 * | 8/2025 | Morrey | G06F 30/20 |

OTHER PUBLICATIONS

Shao et al., Evaluating connected and autonomous vehicles using a hardware-in-the-loop testbed and a living lab, 2019, Transportation Research Part C 102, pp. 121-135 (Year: 2019).*
Rankin et al., A Hardware-in-the-Loop Simulation Platform for the Verification and Validation of Safety Control Systems, Apr. 2011, IEEE Transactions on Nuclear Science, vol. 58, No. 2, pp. 468-478 (Year: 2011).*

\* cited by examiner

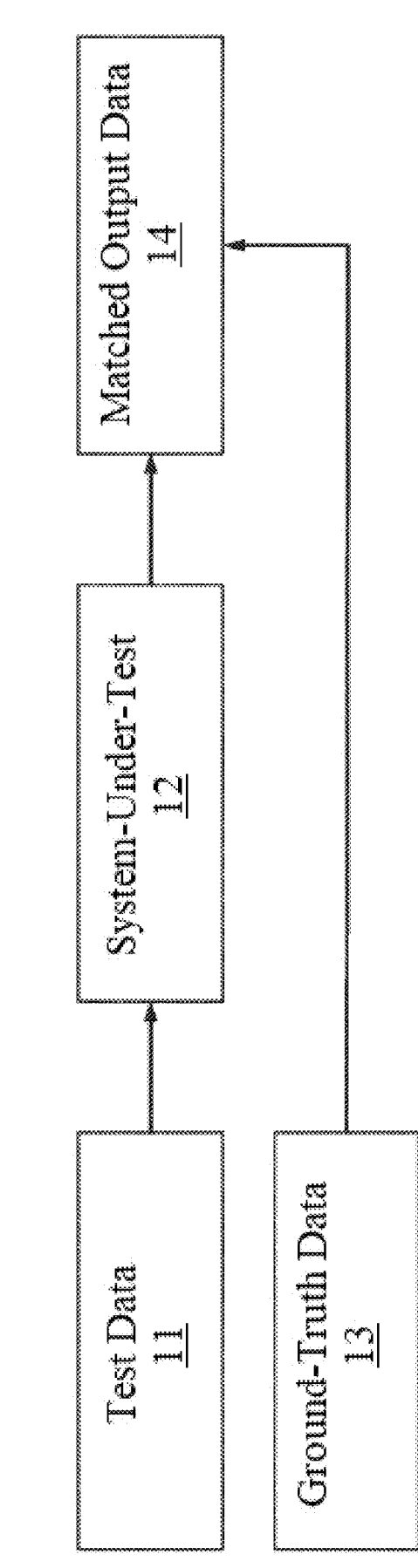

METHOD FOR A CONTINUOUS INTEGRATION APPROACH OF DRIVER ASSISTANCE SYSTEMS

CROSS-REFERENCE TO RELATED APPLICATION

This application claims priority on German Patent Application No 10 2023 113 400.0 filed May 23, 2023, the entire disclosure of which is incorporated herein by reference.

BACKGROUND

Field of the Invention. The disclosure relates to a method for a continuous integration approach to improve driver assistance systems based on data-driven validation. The disclosure also relates to a test system that uses a continuous integration approach for improving driver assistance systems.

Related Art A continuous integration approach describes a method from software development in which a current state of a software project is compiled and tested automatically at short intervals (e.g., daily). This makes it possible to detect and fix errors very early on and at a stage where the errors are still small in impact on the continuously evolving software project. A prerequisite for this continuous integration approach is a continuous availability of compilable and testable overall software of the software project.

Automated Driver Assist Systems (ADAS) and Automated Driving Systems (ADS) use sensors on a vehicle and external devices or data feeds that communicate with the vehicle to help a driver respond to current conditions or to cause the vehicle to respond without direct driver input. For example, an ADAS or ADS is capable of performing certain driving maneuvers or assisting the driver in performing certain driving maneuvers, such as accelerating, decelerating, braking, steering, vibrating the steering wheel, producing audio or visual alerts or the like based on information sensed by the vehicle or otherwise communicated to the vehicle, such as accident ahead, icy road ahead or the like. The large number of inputs that must be considered by an ADAS or ADS, the speed at which those inputs change independently of one another or change with dependence on one another, the speed at which reactions must be made and the way in which one reaction affects other required reactions make periodic complete revisions to an ADAS or ADS difficult and costly. Inputs must be assessed and ADAS/ADS reactions must be made essentially in real time. Simple pen and paper evaluations to identify problems or develop solutions are effectively impossible.

Continuous integration approaches have been applied only to limited to simple sub-component verification testing with respect to Automated Driver Assist Systems (ADAS) and Automated Driving Systems (ADS). More particularly, continuous integration approaches have been tried in simple test cases, such as HMI (human machine interface) tests and tests regarding communication with partner control devices. However, many relevant test cases or traffic scenarios are not tested. This is because these test cases are very complex to reproduce and also usually are not known at all or lack a description.

ADAS/ADS also has the property of functional inadequacy. This means that all scenarios occurring in traffic would have to be processed correctly by the driver assistance systems. However, a number of these scenarios are so large that they are not all known and cannot be described in a specification. As a result, specification-derived verification testing of continuous integration approaches is also incomplete.

U.S. Pat. No. 10,255,168 discloses a method for generating test cases for autonomous vehicles. The test cases are generated automatically based on data from vehicles participating in public road traffic.

US 2021/0103283 A1 discloses a simulation system for simulating autonomous motor vehicle where the simulation system processes sensor data from traffic scenarios, and errors and problems are automatically found using a continuous integration approach.

DE 10 2019 134 053 A1 describes an application method for driving assistance systems where new application states are tested with regard to their performance by means of a continuous integration environment.

In light of this, an object of the invention is to provide a method and system for a continuous integration approach to a driver assistance system where an overall software of the driver assistance system is tested in day-to-day traffic situations. Test cases to be considered should go beyond simply structured test cases and can also cover customer-specific scenarios.

SUMMARY OF THE INVENTION

A method is provided for a continuous integration approach of driver assistance systems where measurement data are measured by vehicle sensors while driving of a vehicle in real traffic, and vehicle actuator settings are determined. The measurement data and settings are stored in a test data set that comprises a time series of input data and output data of the driver assistance system. The test data set is used to test a system-under-test where an automated driver assistance system (ADAS) or an automated driving system (ADS) is selected as the system-under-test. The ADAS or ADS is capable of performing certain driving maneuvers or assisting the driver in performing certain driving maneuvers, such as accelerating, decelerating, braking, steering, vibrating the steering wheel, producing audio or visual alerts or the like based on information sensed by the vehicle. This disclosure encompasses such ADAS and ADS features that are known in the prior art and those that are yet to be developed. The system-under-test is formed or represented by an overall software, with the overall software being continuously changed. The following steps of a data-driven validation are performed repeatedly at predetermined time intervals:

loading a current software version of the overall software forming the system-under-test onto a server;

compiling the current software version on the server to an executable computer program (thus simultaneously testing compilability);

transferring the computer program to a hardware-in-the-loop test bench (thus simultaneously testing a transfer operation, such as by flashing);

loading the test data set onto the hardware-in-the-loop test bench;

running the computer program on the hardware-in-the-loop test bench while feeding the input data to the test data set;

logging a respective difference in output between the current software version and the output data of the test data set;

simultaneously matching the output of the current software version with ground-truth data, thereby inferring an improvement or deterioration of a performance of the current software version and assigning a perfor-
mance score to the respective differences;

forming a performance statistic on all differences and
their performance score; evaluating changes in the
overall software based on the performance statistic; and
outputting a report.

The changed overall software is executed during control-
ling of a real vehicle in real time.

The method advantageously enables automatic validation
of a driver assistance system under customer-specific opera-
tion. These automated tests do not require a human test
engineer, and hence can be run around the clock in real time
with respect to events occurring in the vehicle.

In one embodiment of the method, the test data set is
generated from at least one of the following sources: cus-
tomer vehicles that participate in normal road traffic,
vehicles that participate in a test of the system-under-test in
normal road traffic.

In a further embodiment, the test data set is formed from
at least one time series belonging to: sensor data, map
material, traffic conditions, output of the driver assistance
system.

In a continued further embodiment, newly occurring
system-under-test errors are listed by the report during
validation iteration.

In still a further embodiment of the method, an open loop
ADAS/ADS is tested as a system-under-test.

The system-under-test may be formed by one of the
following open-loop driver assistance systems: traffic sign
recognition, night vision, ego motion locator.

In another embodiment, at least one subcomponent of a
closed-loop system is tested using concepts of functional
decomposition. In this case, the closed-loop system com-
prises at least one closed-loop subcomponent and at least
one open-loop subcomponent. The at least one open-loop
subcomponent is selected as the at least one subcomponent
to be tested. Thus, for example, in a distance control cruise
control, all perception components or a lateral control can be
tested as open-loop subcomponents. This represents a par-
ticularly advantageous embodiment of the method because a
closed-loop system generally cannot be tested based on
recorded and thus non-changeable data, since any output of
the close-loop system would in turn have repercussions on
the input data.

Some embodiments use a plurality of test benches in
parallel by partitioning the test data sets into plural time
periods and supplying the test data sets to the respective test
benches at the respective time periods. Real-time test pro-
cedures must be performed when using hardware-in-the-
loop test benches. A faster run advantageously can be
effected by the partitioning of the test data sets.

Changes in the software version may be discarded accord-
ing to the evaluation. A new iteration run then is started.

The invention also relates to a test system for a continuous
integration approach of driver assistance systems. The test
system comprises a server and a hardware-in-the-loop test
bench having a computing unit. The computing unit is
configured to execute an algorithm according to a method
described herein.

Further advantages and embodiments of the invention will
emerge from the description and the accompanying draw-
ings.

It is understood that the aforementioned features and the
features yet to be explained in the following can be used not
only in the respectively specified combination, but also in
other combinations or on their own, without departing from
the scope of the invention.

In an example embodiment of the method according to the
invention, a continuous integration approach for systems
with functional inadequacy is presented below. By way of
example, the system-under-test is formed by a traffic sign
recognition software. Video data and bus signals are avail-
able from customer data or from tests that have been
conducted. Changes to the traffic sign recognition software
developed throughout the day are loaded onto a server every
evening. These changes can include, for example, recogni-
tion algorithms, map data, legislative data sets, and fusion
algorithms. The current software version on the server is
compiled and automatically run on a computing unit in a
hardware-in-the-loop test bench. First test cases for compi-
lability and flashability of the software already are per-
formed here. The recorded data then are fed to the hardware-
in-the-loop test bench, so that the testing is run again
"virtually" with the new software. At the same time, the
output of the software, i.e. the traffic sign displayed to the
customer, is matched with ground-truth data. A statistic is
derived from this as to whether the software changes
resulted in an improvement or a deterioration of the perfor-
mance of the ADAS/ADS. A final report may include this
statistic and additional information about newly arising
errors during data-driven validation, such as infrequently
occurring scenarios that lead to errors with the new software,
for example.

BRIEF DESCRIPTION OF THE DRAWING

FIG. 1 is a flowchart of a continuous integration approach
of an embodiment of the system of the invention.

DETAILED DESCRIPTION

FIG. 1 is a flowchart 10 that illustrates a continuous
integration approach in an embodiment of the system
according to the invention. Measurement data 11, measured
and recorded in real traffic by vehicle sensors, forms the
basis for a test data set for a system-under-test 12, and is
performed on a hardware-in-the-loop test bench and thus
passes through a variety of driving scenarios. Output data
are matched 14 with related ground truth data 13, and an
improvement or deterioration of a performance of a current
software version of the system-under-test 12 is inferred from
the comparison 14.

LIST OF REFERENCE SIGNS

10 Continuous Integration ApproachFlowchart
11 Recorded Data
12 System-under-test (SUT)
13 Related Ground-Truth Data
14 Match Output Data with Ground-Truth Data

The invention claimed is:

1. A method that uses a continuous integration approach
for improving driver assistance systems installed in vehicles,
the method comprising:

using sensors on the vehicles for measuring vehicle
operating data while driving the respective vehicles in
real traffic;

determining vehicle actuator settings based on the oper-
ating data sensed by the sensors;

storing the measured vehicle operating data and the
vehicle actuator settings in a test data set that comprises
time series of input data and output data of the driver
assistance system;

testing a system-under-test with the test data set, the system-under-test being formed by an overall software that is changed continuously; and performing data-driven validations repeatedly at predetermined time intervals, each iteration of the data-driven validations including the steps of:

loading a current software version of the overall software forming the system-under-test onto a server;

compiling the current software version on the server into an executable computer program;

transferring the computer program to a hardware-in-the-loop test bench;

loading the test data set onto the hardware-in-the-loop test bench;

running the computer program on the hardware-in-the-loop test bench while feeding the input data to the test data set;

logging differences in output between the current software version and the output data of the test data set;

simultaneously matching the output of the current software version with ground-truth data, thereby inferring an improvement or deterioration of a performance of the current software version and assigning a performance score to the respective differences;

forming a performance statistic on all differences and their performance score;

evaluating changes in the overall software based on the performance statistic; outputting a report; and executing the changed overall software during controlling of a real vehicle, wherein the report lists any new system-under-test errors that occurred during any one of the data-driven validation iterations.

2. The method of claim 1, wherein the test data set is generated from at least one of: customer vehicles that participate in normal road traffic, vehicles that participate in a test of the system-under-test in normal road traffic.

3. The method of claim 1, wherein the test data set is formed by at least one time series of data selected from: sensor data, map material, traffic conditions, and output of the driver assistance system.

4. The method of claim 1, wherein the system-under-test is an automated driver assistance system (ADAS) or an automated driving system (ADS).

5. The method of claim 4, wherein system-under-test is an open loop ADAS or ADS.

6. The method of claim 4, wherein the system-under-test is an open-loop ADAS or ADS that comprises at least one of traffic sign recognition, night vision, ego motion locator.

7. The method of claim 1, further comprising testing at least one subcomponent of a closed-loop system using functional decomposition, wherein the closed-loop system comprises at least one closed-loop subcomponent and at least one open-loop subcomponent, and wherein the at least one open-loop subcomponent is selected as the at least one subcomponent to be tested.

8. The method of claim 1, further comprising using a plurality of the test benches in parallel by partitioning the test data sets (11) into a plurality of time periods and supplying test data sets (11) to the respective test benches at the respective time periods.

9. The method of claim 1, wherein based on the evaluating of the changes in the overall software based on the performance statistic, respective changes in the software version are discarded and a new iteration run is started.

10. A test system that uses a continuous integration approach for improving driver assistance systems installed in vehicles, the test system comprising a server and a hardware-in-the-loop test bench having a computing unit, the computing unit being configured to execute an algorithm according to the method of claim 1.

11. A method that uses a continuous integration approach for improving driver assistance systems installed in vehicles, the method comprising:

using sensors on the vehicles for measuring vehicle operating data while driving the respective vehicles in real traffic;

determining vehicle actuator settings based on the operating data sensed by the sensors;

storing the measured vehicle operating data and the vehicle actuator settings in a test data set that comprises time series of input data and output data of the driver assistance system;

testing a system-under-test with the test data set, the system-under-test being formed by an overall software that is changed continuously;

testing at least one subcomponent of a closed-loop system using functional decomposition, wherein the closed-loop system comprises at least one closed-loop subcomponent and at least one open-loop subcomponent, and wherein the at least one open-loop subcomponent is selected as the at least one subcomponent to be tested; and performing data-driven validations repeatedly at predetermined time intervals, each iteration of the data-driven validations including the steps of:

loading a current software version of the overall software forming the system-under-test onto a server;

compiling the current software version on the server into an executable computer program;

transferring the computer program to a hardware-in-the-loop test bench;

loading the test data set onto the hardware-in-the-loop test bench;

running the computer program on the hardware-in-the-loop test bench while feeding the input data to the test data set;

logging differences in output between the current software version and the output data of the test data set;

simultaneously matching the output of the current software version with ground-truth data, thereby inferring an improvement or deterioration of a performance of the current software version and assigning a performance score to the respective differences;

forming a performance statistic on all differences and their performance score;

evaluating changes in the overall software based on the performance statistic; outputting a report; and executing the changed overall software during controlling of a real vehicle.

12. The method of claim 11, wherein the test data set is generated from at least one of: customer vehicles that participate in normal road traffic, vehicles that participate in a test of the system-under-test in normal road traffic.

13. The method of claim 11, wherein the test data set is formed by at least one time series of data selected from: sensor data, map material, traffic conditions, and output of the driver assistance system.

14. The method of claim 11, further comprising using a plurality of the test benches in parallel by partitioning the test data sets into a plurality of time periods and supplying test data sets to the respective test benches at the respective time periods.

15. The method of claim 11, wherein based on the evaluating of the changes in the overall software based on the performance statistic, respective changes in the software version are discarded and a new iteration run is started.

16. A method that uses a continuous integration approach for improving driver assistance systems installed in vehicles, the method comprising:

using sensors on the vehicles for measuring vehicle operating data while driving the respective vehicles in real traffic;

determining vehicle actuator settings based on the operating data sensed by the sensors;

storing the measured vehicle operating data and the vehicle actuator settings in a test data set that comprises time series of input data and output data of the driver assistance system;

testing a system-under-test with the test data set, the system-under-test being formed by an overall software that is changed continuously; and performing data-driven validations repeatedly at predetermined time intervals, each iteration of the data-driven validations including the steps of:

loading a current software version of the overall software forming the system-under-test onto a server;

compiling the current software version on the server into an executable computer program;

transferring the computer program to a hardware-in-the-loop test bench;

loading the test data set onto the hardware-in-the-loop test bench;

running the computer program on the hardware-in-the-loop test bench while feeding the input data to the test data set;

using a plurality of the test benches in parallel by partitioning the test data sets into a plurality of time periods and supplying test data sets to the respective test benches at the respective time periods;

logging differences in output between the current software version and the output data of the test data set;

simultaneously matching the output of the current software version with ground-truth data, thereby inferring an improvement or deterioration of a performance of the current software version and assigning a performance score to the respective differences;

forming a performance statistic on all differences and their performance score;

evaluating changes in the overall software based on the performance statistic; outputting a report; and executing the changed overall software during controlling of a real vehicle.

17. The method of claim 16, wherein the test data set is generated from at least one of: customer vehicles that participate in normal road traffic, vehicles that participate in a test of the system-under-test in normal road traffic.

18. The method of claim 16, wherein the test data set is formed by at least one time series of data selected from: sensor data, map material, traffic conditions, and output of the driver assistance system.

19. The method of claim 16, wherein based on the evaluating of the changes in the overall software based on the performance statistic, respective changes in the software version are discarded and a new iteration run is started.

20. The method of claim 16, wherein the system-under-test is an automated driver assistance system (ADAS) or an automated driving system (ADS).

\* \* \* \* \*